US011623637B2

(12) United States Patent
Salter et al.

(10) Patent No.: US 11,623,637 B2
(45) Date of Patent: Apr. 11, 2023

(54) ASSISTED PARKING MANEUVERS FOR VEHICLES COUPLED IN A TOWED RECHARGING ARRANGEMENT

(71) Applicant: FORD GLOBAL TECHNOLOGIES, LLC, Dearborn, MI (US)

(72) Inventors: Stuart C. Salter, White Lake, MI (US); Kenneth P. McHugh, Canton, MI (US); Peter Phung, Windsor (CA); David Brian Glickman, Southfield, MI (US); Paul K. Dellock, Northville, MI (US); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 184 days.

(21) Appl. No.: 17/359,898

(22) Filed: Jun. 28, 2021

(65) Prior Publication Data

US 2022/0410872 A1    Dec. 29, 2022

(51) Int. Cl.
*B60W 30/06*    (2006.01)
*B60W 30/09*    (2012.01)
*B60L 53/37*    (2019.01)
*B60L 53/66*    (2019.01)
*B60R 1/00*    (2022.01)
(Continued)

(52) U.S. Cl.
CPC ............. *B60W 30/06* (2013.01); *B60L 53/37* (2019.02); *B60L 53/66* (2019.02); *B60R 1/00* (2013.01); *B60R 11/04* (2013.01); *B60W 30/09* (2013.01); *G06V 20/58* (2022.01); *H04W 4/46* (2018.02); *B60R 2300/102* (2013.01);
(Continued)

(58) Field of Classification Search
None
See application file for complete search history.

(56) References Cited

U.S. PATENT DOCUMENTS 7,378,988 B2 *   5/2008   Nordbruch ........... B62D 15/027
                                              340/440
7,463,137 B2    12/2008   Wishart et al.
(Continued)

OTHER PUBLICATIONS

Chakraborty et al., P2C2: Peer-to-Peer Car Charging, arXiv: 2002.07268, Jan. 28, 2020.

*Primary Examiner* — Fekadeselassie Girma
(74) *Attorney, Agent, or Firm* — David B. Kelley; MacMillan, Sobanski & Todd, LLC

(57) ABSTRACT

Leading and trailing electrified vehicles are coupled together in a towing arrangement for in-flight transfer of an electrical charge between their battery systems. With the vehicles connected by a towing device, a parking maneuver is initiated in which the trailing vehicle leads the leading vehicle. For the parking maneuver, one of the vehicles is designated (e.g., automatically or by driver agreement) to be an active steering vehicle and the other vehicle to be a passive steering vehicle. At least the passive steering vehicle comprises an electrically-controlled steering actuator. During movement, a turning (e.g., steering angle) of the active steering vehicle is monitored. Based on the turning of the active steering vehicle, an assistive steering angle is determined for the passive steering vehicle. The electrically-controlled steering actuator is commanded according to the assistive steering angle. The parking maneuver may be reverse or forward.

20 Claims, 6 Drawing Sheets

(51) Int. Cl.
*H04W 4/46* (2018.01)
*B60R 11/04* (2006.01)
*G06V 20/58* (2022.01)

(52) U.S. Cl.
CPC ... *B60R 2300/303* (2013.01); *B60R 2300/806* (2013.01); *B60R 2300/8086* (2013.01)

(56) References Cited

U.S. PATENT DOCUMENTS

| | | | | |
|---|---|---|---|---|
| 8,275,491 | B2* | 9/2012 | Ferrin | G05D 1/0227 |
| | | | | 242/390.8 |
| 8,457,666 | B2* | 6/2013 | Cai | H04L 51/00 |
| | | | | 455/466 |
| 8,849,518 | B2* | 9/2014 | Nefcy | B62D 15/027 |
| | | | | 701/41 |
| 9,393,996 | B2* | 7/2016 | Goswami | B62D 13/005 |
| 9,527,394 | B1* | 12/2016 | Tang | B60W 10/26 |
| 9,592,798 | B2* | 3/2017 | Lee | B60T 7/12 |
| 10,046,804 | B2* | 8/2018 | Fendt | B60W 30/06 |
| 10,259,390 | B2* | 4/2019 | Zhang | B60R 1/00 |
| 10,525,881 | B1* | 1/2020 | Deshpande | B60Q 9/001 |
| 11,568,744 | B2* | 1/2023 | Diehl | G08G 1/147 |
| 2003/0058337 | A1* | 3/2003 | Tanaka | G06T 1/00 |
| | | | | 382/104 |
| 2007/0198145 | A1* | 8/2007 | Norris | B62D 1/286 |
| | | | | 701/23 |
| 2010/0065344 | A1* | 3/2010 | Collings, III | B60L 3/10 |
| | | | | 180/2.1 |
| 2016/0207528 | A1* | 7/2016 | Stefan | B60W 30/06 |
| 2017/0129536 | A1* | 5/2017 | Xu | B62D 6/001 |
| 2018/0301031 | A1* | 10/2018 | Naamani | G08G 1/148 |
| 2020/0189405 | A1* | 6/2020 | Westfall | B60L 53/30 |
| 2020/0215929 | A1* | 7/2020 | Javaid | B60L 53/126 |
| 2020/0324665 | A1* | 10/2020 | Mackenzie | B60L 53/22 |
| 2020/0341472 | A1* | 10/2020 | Zenner | B60L 53/16 |
| 2022/0379743 | A1* | 12/2022 | Salter | B60L 53/57 |
| 2022/0379958 | A1* | 12/2022 | Salter | B60L 53/18 |
| 2022/0388484 | A1* | 12/2022 | Salter | B60D 1/242 |
| 2022/0410895 | A1* | 12/2022 | Salter | B60W 30/16 |

* cited by examiner

ASSISTED PARKING MANEUVERS FOR VEHICLES COUPLED IN A TOWED RECHARGING ARRANGEMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle-to-vehicle energy transfer for charging a battery of an electrified vehicle, and, more specifically, to automated driver assistance for remote parking of vehicles coupled together for vehicle-to-vehicle energy transfer.

Electrified vehicles, such as a battery electric vehicle (BEV), typically contain a rechargeable battery pack to deliver power to one or more traction motors. The traction motors can propel the electrified vehicles instead of, or in combination with, an internal combustion engine. Plug-in type electrified vehicles include one or more charging interfaces (wireless, inductive charging or direct connection) for charging the battery pack. Plug-in type electrified vehicles are usually charged while being parked at a charging station or some other utility power source.

The need to be plugged in at a charging station may require the electrified vehicle to remain stationary for lengthy periods of time. When undertaking a trip exceeding the charge capacity of the battery pack, a traveler may be delayed by the need for a recharge. To reduce or avoid such delays, vehicle-to-vehicle in-flight energy transfer systems can be used in which vehicles are coupled together (e.g., in a towing relationship) in order to move together as a unit while electrical energy supplied by one of the vehicles is used to recharge a battery pack in the other vehicle.

Energy may be transferred from a towing or leading vehicle to a towed or trailing vehicle, from the trailing vehicle to the leading vehicle, or in both directions during the in-flight energy transfer events. Systems may be provided to coordinate the terms and conditions of a service agreement between the leading and trailing vehicles, to coordinate the publication of a service experience rating from a user of the leading and/or trailing vehicle, and/or to coordinate the termination of the in-flight charging event by either user.

While a leading vehicle is towing a trailing vehicle, the driving task may be conducted using the leading vehicle to steer and to generate propulsion to advance both vehicles. As disclosed in pending U.S. patent application Ser. No. 17/224,165, filed Apr. 7, 2021, electronic communication between vehicles may enable the leading vehicle to request the trailing vehicle to activate its drive system to generate assistive torque for increasing acceleration of the coupled vehicles.

A towing event may be primarily comprised of driving the coupled vehicles forward toward a destination. During forward movement, steering the vehicles using the leading vehicle is relatively straightforward. However, when a destination or waypoint is reached, it may be desired to park the coupled vehicles in a particular location by forward or reverse travel at slow speed (e.g., pulling into a parking space for uncoupling the vehicles). In particular, backing up while towing can be difficult because of interactions between the steering angles of the vehicles, poor visibility, lack of experience, and other factors. Imperfect steering during backup can result in uneven tire wear, waste of energy, collision with other objects, or the vehicles becoming stuck in a jackknifed condition.

SUMMARY OF THE INVENTION

In one aspect of the invention, an electrified vehicle comprises a rechargeable battery system configured to store electrical energy used to provide propulsion of the electrified vehicle. The rechargeable battery system is adapted to exchange electrical energy with a second vehicle which is coupled to the electrified vehicle in a towing relationship, in which one of the vehicles is a leading vehicle and the other one of the vehicles is a trailing vehicle. A communication link is provided for exchanging communication signals with the second vehicle. A first controller in the electrified vehicle is adapted to be coupled to a second controller in the second vehicle via the communication link. The first controller is configured to initiate a reverse parking maneuver in cooperation with the second controller using the communication signals, wherein the reverse parking maneuver includes a designated one of the vehicles being an active steering vehicle and a designated one of the vehicles being a passive steering vehicle. The passive steering vehicle comprises an electrically-controlled steering actuator. The first controller is configured to interact with the second controller during the reverse parking maneuver such that the controllers A) monitor a turning of the active steering vehicle, and B) command the electrically-controlled steering actuator according to an assistive steering angle for the passive steering vehicle based on the turning of the active steering vehicle.

DETAILED DESCRIPTION OF PREFERRED EMBODIMENTS

Figure 1:
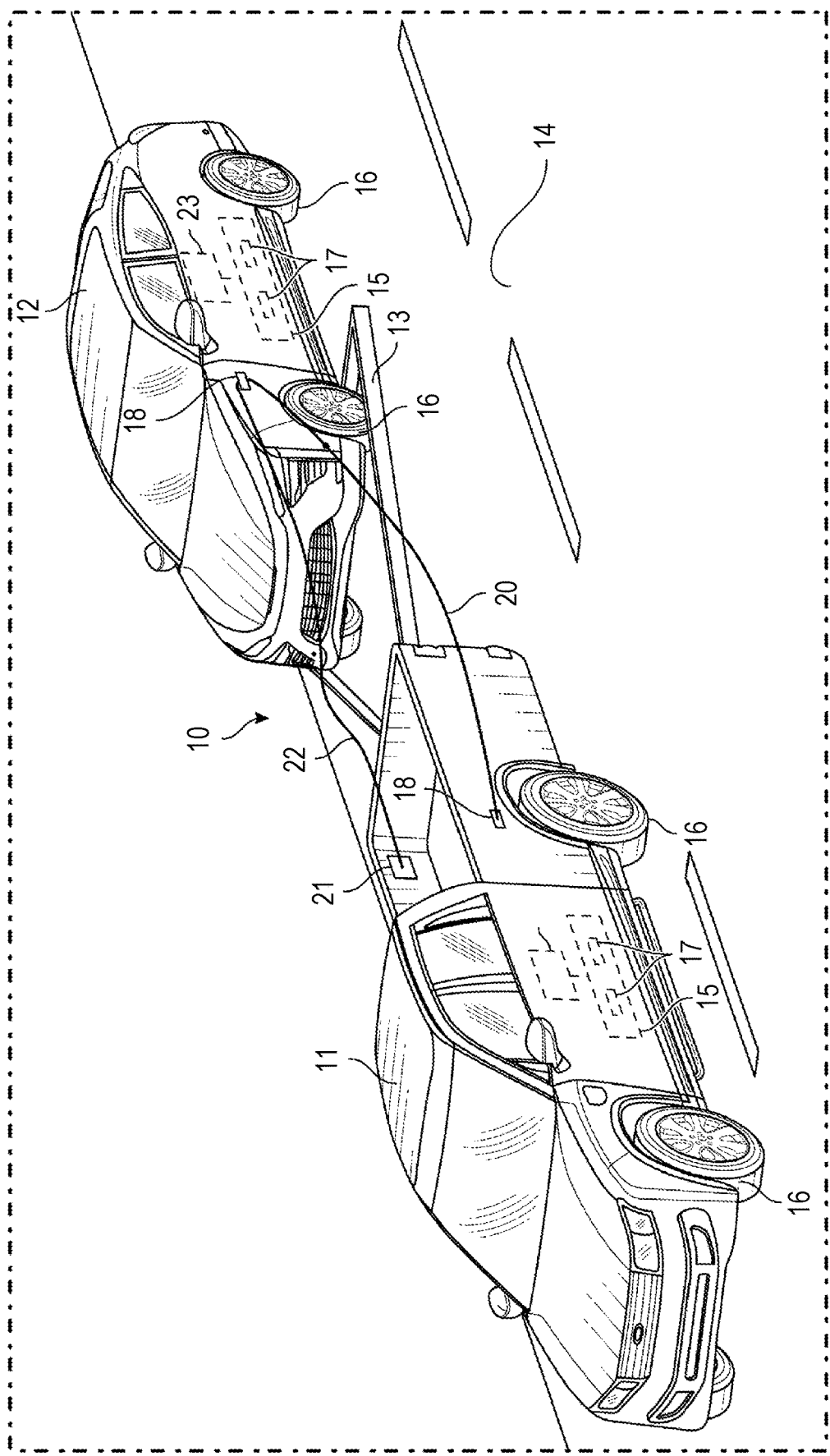
FIG. 1 is a perspective view of leading and trailing vehicles coupled together for in-flight charging.

FIG. 1 schematically illustrates an exemplary vehicle-to-vehicle (V2V) in-flight energy transfer system 10 for transferring energy in either direction between a towing or leading vehicle 11 and a towed or trailing vehicle 12 during a towing event. The term "in-flight" refers to coupled movement of leading vehicle 11 and trailing vehicle 12. Accordingly, system 10 enables the bidirectional transfer of energy from the leading vehicle 11 to the trailing vehicle 12 or vice-versa while the leading and trailing vehicles 11, 12 are making forward progress toward their desired destinations.

In-flight energy transfer may be beneficial to both participating parties. For example, the user/owner of the trailing vehicle 12 may take advantage of the time while being towed by resting, sleeping, eating, working, etc., and the user/owner of the leading vehicle 11 may generate income for performing the towing/charging task (e.g., as a revenue opportunity).

A towing device 13 may releasably couple trailing vehicle 12 with leading vehicle 11 to allow leading vehicle 11 to pull trailing vehicle 12 along a roadway 14 and thus control driving of the trailing vehicle 12 during a towing event. Towing device 13 could by any type of towing device (e.g., a towing tray) adapted to provide appropriate mechanical and/or electrical coupling. Accordingly, a specific configuration of towing device 13 is not intended to limit this disclosure. In cases where the power connection necessitates a towing tray be closest to the charge port but the drive wheels (of the trailing vehicle) are not on the towing tray but rather on the ground, the transmission of the trailing vehicle would be set to neutral and appropriate systems would be activated to protect the powertrain. In some embodiments, the trailing vehicle may be an autonomous (self-driving) vehicle, and the "towing" interconnection may be configured to provide electrical cables for power delivery and/or communication without a mechanical connection for physically propelling one vehicle from the other (i.e., the tandem arrangement would be only for power delivery). In such a situation, the autonomous trailing vehicle handles its own steering, braking, and acceleration.

In an embodiment, leading vehicle 11 and trailing vehicle 12 are both plug-in type electrified vehicles (e.g., a plug-in hybrid electric vehicle (PHEV) or a battery electric vehicle (BEV)). Each of leading and trailing vehicles 11, 12 includes a traction battery pack 15. Leading vehicle 11 and trailing vehicle 12 may each include an electrified powertrain capable of applying a propulsive torque from an electric machine (e.g., an electric motor) for driving drive wheels 16 of leading and trailing vehicles 11, 12. Therefore, the powertrain of each of leading vehicle 11 and trailing vehicle 12 may electrically propel the respective set of drive wheels 15 either with or without the assistance of an internal combustion engine. In some embodiments, only the vehicle receiving energy to recharge a battery pack is an electrified vehicle (e.g., a vehicle delivering electrical energy to the electrified vehicle may use a different type of propulsion, such as an internal combustion engine, while also having means for supplying the electrical energy to be transferred).

Traction battery packs 15 may be configured as a high voltage traction battery pack that includes a plurality of battery arrays 17 (i.e., battery assemblies or groupings of battery cells) capable of outputting electrical power to one or more electric machines of each vehicle. Other types of energy storage devices and/or output devices may also be used to electrically power each of leading vehicle 11 and trailing vehicle 12. From time to time, charging the energy storage devices of traction battery pack 20 may be required or desirable. Each of leading and trailing vehicles 11, 12 may therefore be equipped with a charging system that includes a charge port assembly 18. A charge cable 20 (e.g., Electric Vehicle Supply Equipment or EVSE) may be connected to the corresponding charge port assemblies 18 of leading and trailing vehicles 11, 12 in order to transfer charge energy between traction battery packs 20 (e.g., from leading vehicle 11 to trailing vehicle 12 or from trailing vehicle 12 to leading vehicle 11). Charge cable 26 may be configured to provide any level of charging (e.g., Level 1 AC charging, Level 2 AC charging, DC charging, etc.).

A charging system of leading vehicle 11 may optionally be equipped with a secondary charge port assembly 21. In an embodiment, secondary charge port assembly 28 is mounted within a cargo space of leading vehicle 11 for providing access to a power source at an external location of the leading vehicle 11. A charge cable 22 may be connected between secondary charge port assembly 28 and charge port assembly 18 of trailing vehicle 12 in order to transfer charge energy. Charge cable 22 may be configured to provide Level 1 or Level 2 AC charging, for example. In another embodiment, energy can be transferred between leading and trailing vehicles 11, 12 using both charge cable 20 and charge cable 22. Although not specifically shown, leading vehicle 11 and/or the trailing vehicle 12 could be equipped with one or more additional charging interfaces. Further, towing leading vehicle 11 may have a portable power back in the cargo bed which is not part of vehicle 11 which may be used as the power source for trailing vehicle 12.

Respective charging systems of leading and trailing vehicles 11, 12 may additionally include a bidirectional power transfer system 23 configured for enabling the bidirectional transfer of power between the vehicles 11, 12. Bidirectional power transfer system 34 may be operably connected between a respective charge port assembly 18 and a respective traction battery pack 15 of each of leading vehicle 11 and trailing vehicle 12. Bidirectional power transfer system 23 may include various equipment, such as a charger, a converter, and/or a motor controller (which may be referred to as an inverter system controller or ISC). Bidirectional power transfer systems 23 may additionally be configured to transfer energy between traction battery packs 15 and electric machines (e.g., traction motors) of each respective vehicle.

One non-limiting example of a suitable bidirectional power transfer system that may be employed for use within leading vehicle 11 and/or trailing vehicle 12 for achieving bidirectional power transfer is disclosed within US Patent Publication No. 2020/0324665, assigned to Ford Global Technologies, LLC, the disclosure of which is herein incorporated by reference. However, other bidirectional power transfer systems could also be utilized for achieving the bidirectional transfer of power between leading and trailing vehicles 11, 12 within the scope of this disclosure.

FIG. 1 schematically illustrates an in-flight configuration wherein power may be transferred from traction battery pack 15 of leading vehicle 11 to traction battery pack 15 of trailing vehicle 12 (as schematically depicted by an arrow 24). Alternatively, power may be transferred from traction battery pack 15 of trailing vehicle 12 to traction battery pack 15 of leading vehicle 11 (e.g., so that trailing vehicle 12 may transfer an electrical charge to leading vehicle 11 during the in-flight towing and charging event to be used to increase the towing distance that leading vehicle 11 is capable of towing trailing vehicle 12). In either case, leading vehicle 11 provides the main propulsion for moving the coupled vehicles forward, and driving is under control of the driver of leading vehicle 11.

While driving the vehicles in a towing arrangement, it may be desired to move in a reverse direction (referred to herein as a reverse parking maneuver in which the trailing vehicle leads the leading vehicle) such as moving into or out of a parking space. Backing up while towing a trailer can be difficult to perform due to limitations of maneuverability and visibility, for example. The invention provides parking (forward or backup) assistance that takes advantage of capabilities of both vehicles in a cooperative manner to obtain many benefits such as reduced tire wear, more efficient energy usage from reduced friction, extended turning radius, and ease of control (e.g., added stability and visibility).

In some embodiments, electric power-assisted steering (EPAS) systems which may be present in one or both vehicles are utilized to perform automatically controlled steering adjustments for enhanced reverse maneuvering controls during parking maneuvers when connected together in an in-flight bi-directional charging configuration. While this description mainly discusses a backup parking maneuver, it is equally applicable to parking while moving in a forward direction. The EPAS systems or other systems such as electronic stability control (ESC) systems may be used for obtaining steering inputs from a driver (e.g., from a steering angle and/or steering torque sensor). EPAS/ESC information for both vehicles can be shared with each other through a wired or a wireless communication link which may be comprised of WiFi, V2V, Bluetooth® (BLE), or Ultra-Wideband (UWB), for example. When intending to execute a reverse parking maneuver, drivers of each vehicle may communicate over the communication link or other channel in order to establish that both are supporting the maneuver. A reverse maneuver can be initiated (e.g., from a stopped condition) by one of the drivers placing their gear selector into reverse gear. Alternatively, the desire to execute a reverse maneuver could be communicated via a display screen, audio messaging, or other human machine interface (HMI). If the other driver confirms the reverse maneuver, they may signify their agreement by shifting the gear selector in their vehicle to reverse or neutral, for example. Alternatively, the second driver could use a display screen or other HMI to confirm the maneuver. While a reverse parking maneuver may be easiest to execute for a driver in the trailing vehicle (since the trailing or trailered vehicle is the one that leads during the backing up), it would be possible to allow either driver to initiate a reverse maneuver and to assert primary control over the steering, throttle, and braking of the maneuver. When it is agreed that the driver of the leading vehicle will have backup control of steering, throttle, and brakes, it would be possible to transfer their steering, throttle, and braking commands from the leading vehicle to the trailing vehicle for implementation (e.g., steer-by-wire steering commands based on steering wheel movement in the leading vehicle could be sent to the EPAS system of the trailing vehicle so as to steer the trailing vehicle remotely from the leading vehicle). In any case, the drivers agree upon one vehicle being designated an active steering vehicle (in which manual driver actions of turning a steering wheel used to directly control the steering angle and other parameters such as throttle and brake) and the other vehicle being designated as a passive steering vehicle (in which automatically determined steering/throttle/braking actions are performed automatically). Typically, a trailing vehicle (which leads during the reverse movement) may be controlled as the active steering vehicle and a leading vehicle may be controlled as the passive steering vehicle.

Control aspects of the present invention can be executed in one or more controllers located in either or both of the vehicles. In-flight charging functions and reverse maneuvering functions can be implemented using a dedicated control module, incorporated in an existing control module such as an electronic stability control (ESC) module, an electric power-assist steering (EPAS) module, a battery control module (BCM), or a powertrain control module (PCM), or can be distributed among these or other control modules. Typically, a first controller located in one of the vehicles is coupled to a second controller in the other one of the vehicles via a communication link. The controllers are configured to cooperatively initiate a reverse parking maneuver based on the communication signals. One of the vehicles is designated an active steering vehicle (either by mutual agreement of the drivers or automatically, such as when it is desired to always control the reverse maneuver from the trailing vehicle), and the other vehicle is designated a passive steering vehicle. At least the passive steering vehicle has an electrically-controlled steering actuator (e.g., EPAS system) so that it can be automatically steered.

Figure 2:
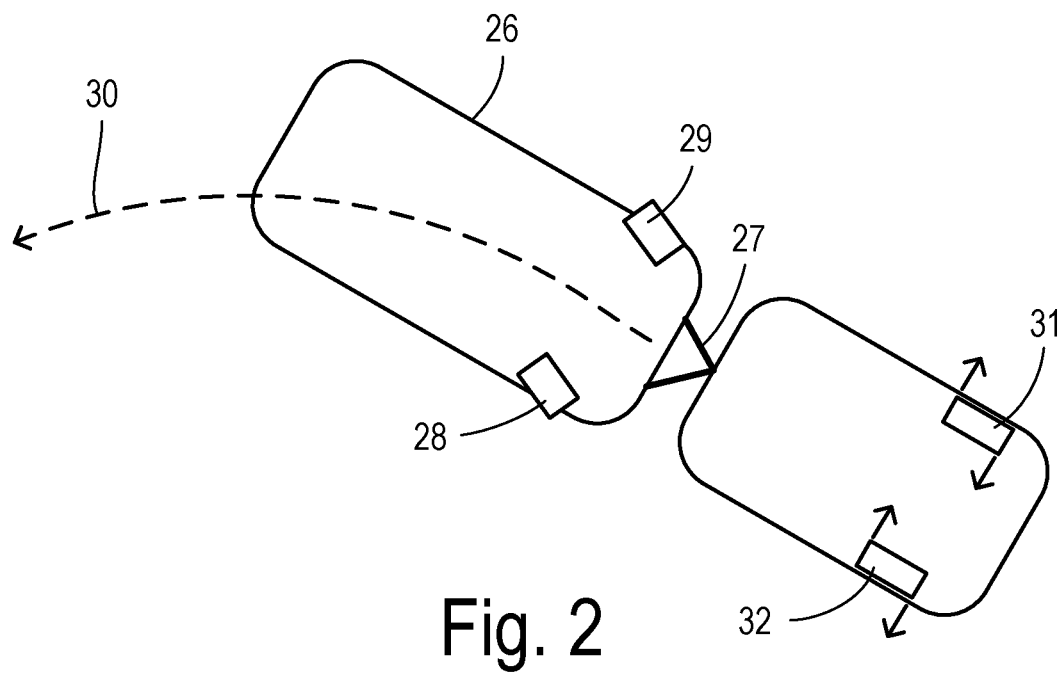
FIG. 2 is a diagram depicting a reverse parking maneuver in which steering actions of one vehicle are used to generate automatic steering responses in the other vehicle.

When the reverse parking maneuver is underway, the first and second controllers interact in a manner that monitors a turning of the active steering vehicle, determines an assistive steering angle for the passive steering vehicle based on the turning of the active steering vehicle, and commands the electrically-controller steering actuator according to the assistive steering angle. As shown in FIG. 2, a leading vehicle 25 is coupled with a trailing vehicle 26 in a towing arrangement by a towing device 27. During a reverse parking maneuver, steered wheels 28 and 29 may be turned in order to follow a desired backup path 30. Steered wheels 31 and 32 are automatically adjusted by an electrically-controlled steering actuator to follow or otherwise facilitate the performance of the reverse maneuver. The automatically adjusted steering angle may be determined according to a process for optimizing chosen variables (e.g., tire scrubbing) and may include compensating actions when an undesirable outcome is sensed or predicted.

In some embodiments, an ESC controller module or other vehicle controller may transmit data messages from one vehicle to the other which include dynamically measured quantities such as a steering angle (e.g., expressed as a percentage of full steering wheel rotation or an absolute angle), a yaw rate (e.g., rate of steering wheel rotation to distinguish between soft and hard turns), lateral acceleration (to identify centrifugal force when turning a corner), tire pressure, parking brake status, wheel speed (for use in momentum control), camera data (e.g., for curb detection), and detected obstacles near the vehicle (e.g., using ultrasonic detectors). Data messages can also include static quantities needed for characterizing system responses, such as vehicle weight, tire size, wheelbase sizes (e.g., in order to model a turn radius and/or other maneuvering capabilities), distance from rear tire to the hitch point or other towing device (e.g., including hitch lengths).

Manual steering controls in the passive steering vehicle (e.g., the leading vehicle) may be disabled during a reverse parking maneuver by disabling its steer-by-wire capability. In place of manual controls, an assistive steering angle is determined for the passive steering vehicle based on the manual turning of the active steering vehicle, and the electrically-controlled steering actuator (e.g., EPAS) of the passive steering vehicle is commanded to adopt the assistive steering angle. Manual steering control would be re-enabled once the vehicles are decoupled and/or the reverse maneuver is completed.

In one embodiment, an assistive steering angle is determined according to a calculation for minimizing an incidence of scrubbing at the wheels of the passive steering vehicle (e.g., tire scrubbing at the leading vehicle). During a reverse parking maneuver, a controller(s) handling in-flight charging, steering, throttle, and/or braking function in the leading (passive steering) vehicle continuously monitors EPAS/ESC data from the trailing (active steering) vehicle to align closely with the trailing vehicle turning maneuvers. For example, when the steering wheel is turned in the trailing vehicle, an EPAS controller of the leading vehicle will mimic the turn rate of the trailing vehicle so that the vehicles move in tandem in a way that minimizes tire scrubbing (e.g., sliding) at the leading vehicle. More specifically, an operational sequence may include the leading vehicle driver shifting a gear selector into a Park or a Reverse position and then initiating a backup request message to the driver in the trailing vehicle (e.g., a request to transfer steering/throttle/braking control to the driver of the trailing vehicle). The driver in the trailing vehicle may acknowledge the change in control by shifting the trailing vehicle into a Reverse position of the gear selector. The shifting can be confirmed to the leading vehicle in a data message, so that the leading vehicle then shifts into a reverse or a neutral gear. The driver in the trailing vehicle then begins to back up, including making turns of the steering wheel (which are sensed as a steering cycle and/or as steering wheel torque values). One or more of the In-flight Charging, EPAS, ESC, or other controllers in either or both vehicles determines target steering data (i.e., an assistive steering angle) for the passive steering vehicle to match the steering path of the active steering vehicle, and corresponding commands are transmitted to a steering actuator (e.g., an EPAS motor) in the passive steering vehicle. Calculation of the assistive steering angle is configured to direct the path of the leading vehicle such that it follows a turning radius with minimized tire scrubbing based on transmitted data (from a steering angle sensor, an electronic stability control module, or a powertrain control module, for example). The calculation for the assistive steering angle may preferably conform a movement path of the passive steering vehicle to movement path 30 of the active steering vehicle in FIG. 2.

Figure 3:
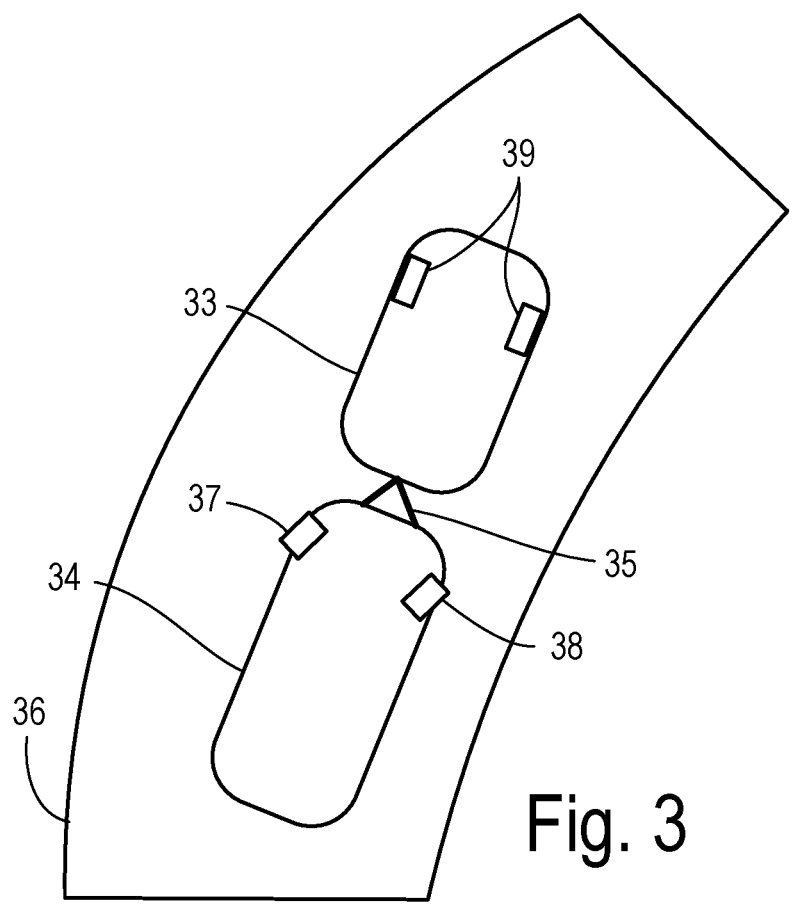
FIG. 3 is a diagram depicting a steering action of the trailing vehicle potentially leading to a jackknifed condition, with the leading vehicle generating a steering response for preventing the jackknifed condition.

In another embodiment, the assistive steering angle is determined according to a calculation for preventing the vehicles from entering a jackknife condition. Steering and braking of the leading vehicle can be automatically determined in ways that mimic steering of the trailing vehicle so as to increase stability and to help reduce the possibility of jackknifing (e.g., reaching a hitch angle of 90° or an angle small enough to result in an impact between the vehicles) or other severe misalignment of the vehicles. For example, if a steering target of the trailing vehicle (e.g., X %) is not achieved after a certain travel distance, a compensating steering angle may be determined for the leading vehicle which tends to bring the vehicles back into alignment and prevents jackknifing. An onset of jackknifing can be detected by monitoring relative positions of the vehicles. For example, outward-looking cameras (e.g. backup cameras) and object detection sensors (e.g., ultrasonic sensors) may be used to determine vehicle orientations. If jackknifing is determined to be imminent, a warning message can be sent to drivers of both vehicles and/or the automatic controllers. When a desired turning rate is not being met, a command can be sent to increase/decrease a steering angle of the active steering (trailing) vehicle in order to improve the alignment (e.g., both vehicles may apply an additional angle of turn to allow sharper maneuverability as a whole unit). As shown in FIG. 3, a leading vehicle 33 is coupled with a trailing vehicle 34 by a towing device 35. A driver in trailing vehicle 34 is following a reverse parking maneuver along a curved path 36 using a larger steering angle for wheels 37 and 38 to make a sharp turn. A similar sharp turn with wheels 39 of leading vehicle 33 may result in a jackknife condition. Consequently, wheels 39 have been automatically turned to a more straight position to avoid the jackknife condition.

If equipped, 4-way steering can be used to improve the situation for greater maneuverability in tight spaces. In 4-way steering, the front and rear wheels can be turned in the same direction to allow for side-ways maneuverability.

In another embodiment, the assistive steering angle is determined according to a calculation for maximizing a turning radius when the turning of the active steering vehicle indicates a steering lock condition. Thus, a sharper turning radius can be achieved using the passive steering vehicle than could be achieved by the active steering vehicle alone. This mode of reverse steering may be applied at low speeds (e.g., less than 10 kph) for more maneuverability. When the steering wheel of the active steering (trailing) vehicle has been turned to an end-to-end lock position (indicating a maximum steering angle), the EPAS of the passive steering (leading) vehicle may be engaged to maximize the steering (e.g., shorten the turning radius) through an added or subtracted turning angle. For example, when a desired turn rate is not met even though the active steering vehicle has its steering in a steering lock condition, an assistive steering angle for the passive steering (leading) vehicle can be determined which artificially creates oversteer in the trailing vehicle to assist in turning through a tight turning radius. Furthermore, a throttle limit may be used to enforce a slow speed when a maximum turning outcome is needed.

Figure 4:
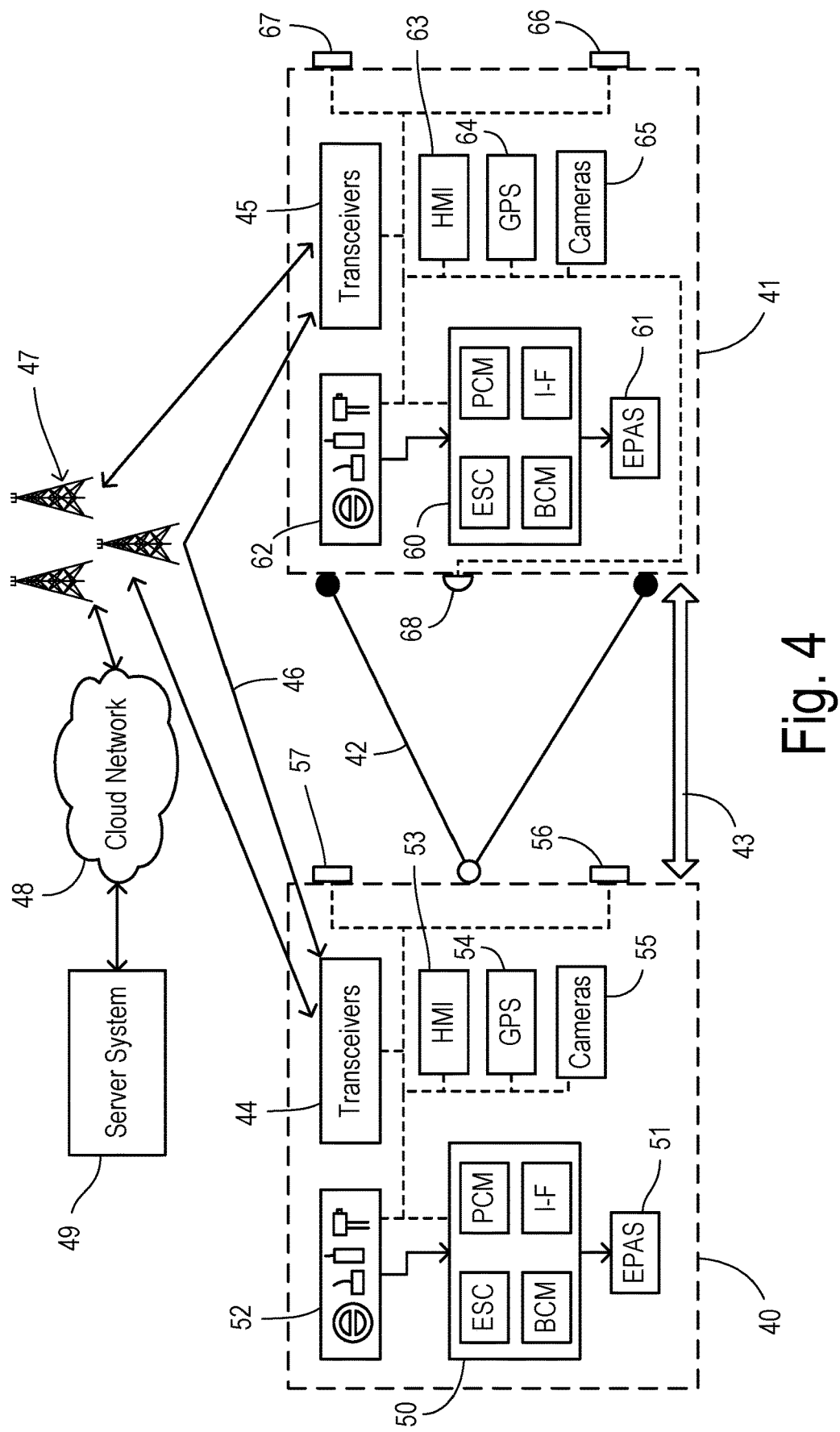
FIG. 4 is a block diagram showing an embodiment of vehicle components and remote infrastructure for implementing an in-flight charging system.

FIG. 4 shows an in-flight charging system as implemented in a leading vehicle 40 and a trailing vehicle 41 coupled by a towing device 42. A hard-wired coupling 43 may provide appropriate media for transferring electrical energy for charging as well as digital communication signals between electronic components of the vehicles as a communication link. Alternatively, a communication link may include transceivers 44 and 45 in vehicles 40 and 41, respectively, which exchange wireless communication signals via a direct path 46 (e.g., using Bluetooth®, WiFi, UWB, V2V. etc.) or via a cellular data network 47. Cellular network 47 may preferably be coupled to a cloud network 48 and a server system 49 which handle administrative aspects of the in-flight charging set-up and financial compensation. Communication with cloud network 48 may alternatively be provided via a DSRC or V2V infrastructure. The in-flight charging service could also be served from one of the vehicles to the other, with communication being achieved over BLE, UWB, or WiFi.

Vehicle 40 comprises a controller network 50 which may include an in-flight (I-F) controller, ESC controller, PCM controller, and/or BCM controller which are configured according to the operations as disclosed for supporting the reverse parking maneuvers. An EPAS system 51 includes an electric steering actuator and an associated controller. User (e.g., driver) inputs 52 include sensors for detecting operational positions of a steering wheel, brake pedal, accelerator pedal, and gear shift selector, all of which provide their position data to controllers 50. Vehicle 40 further includes a human-machine interface 53 (e.g., a touchscreen display), a GPS receiver 54, a suite of cameras 55, and ultrasonic backup sensors 56 and 57. Cameras 55 include a plurality of outward-looking cameras capturing respective exterior images, which may preferably span 360° around vehicle 40.

Trailing vehicle 41 comprises a controller network 60 which may include an in-flight (I-F) controller, ESC controller, PCM controller, and/or BCM controller which are configured according to the operations as disclosed for supporting the reverse parking maneuvers. An EPAS system 61 includes an electric steering actuator and an associated controller. User (e.g., driver) inputs 62 include sensors for detecting operational positions of a steering wheel, brake pedal, accelerator pedal, and gear shift selector, all of which provide their position data to controllers 60. Vehicle 41 further includes a human-machine interface 63 (e.g., a touchscreen display), a GPS receiver 64, a suite of cameras 65, ultrasonic backup sensors 66 and 67, and a forward-looking radar 68. Cameras 65 include a plurality of outward-looking cameras capturing respective exterior images, which may preferably span 360° around vehicle 41.

In some embodiments, the exterior camera images of both the trailing and leading vehicles are shared (e.g., transmitted from each vehicle to the other) so that either of the vehicles can create a merged mosaic image (e.g., stitched panoramic image) for display on a display screen within the vehicles (e.g., in the active steering vehicle for use by the active driver). The combined, stitched images can provide better visibility for a reverse or forward parking maneuver while in the in-flight bi-directional charging configuration. Both the exterior camera images and object detection information from backup sensors 56, 57, 66, and 67 may preferably be transmitted through the communication link. The availability of the shared 360° images surrounding coupled vehicles 40 and 41, either vehicle can calculate and display representations of potential obstacles and/or predicted or planned movement paths as overlays on a displayed mosaic or other image.

At night or in darkened environments, exterior lighting (such as puddle lights or running lights) may be activated on the vehicles to provide better lighting for the cameras across the full panoramic views. Headlights of the trailing vehicle may be dimmed in order to reduce glare.

Figure 5:
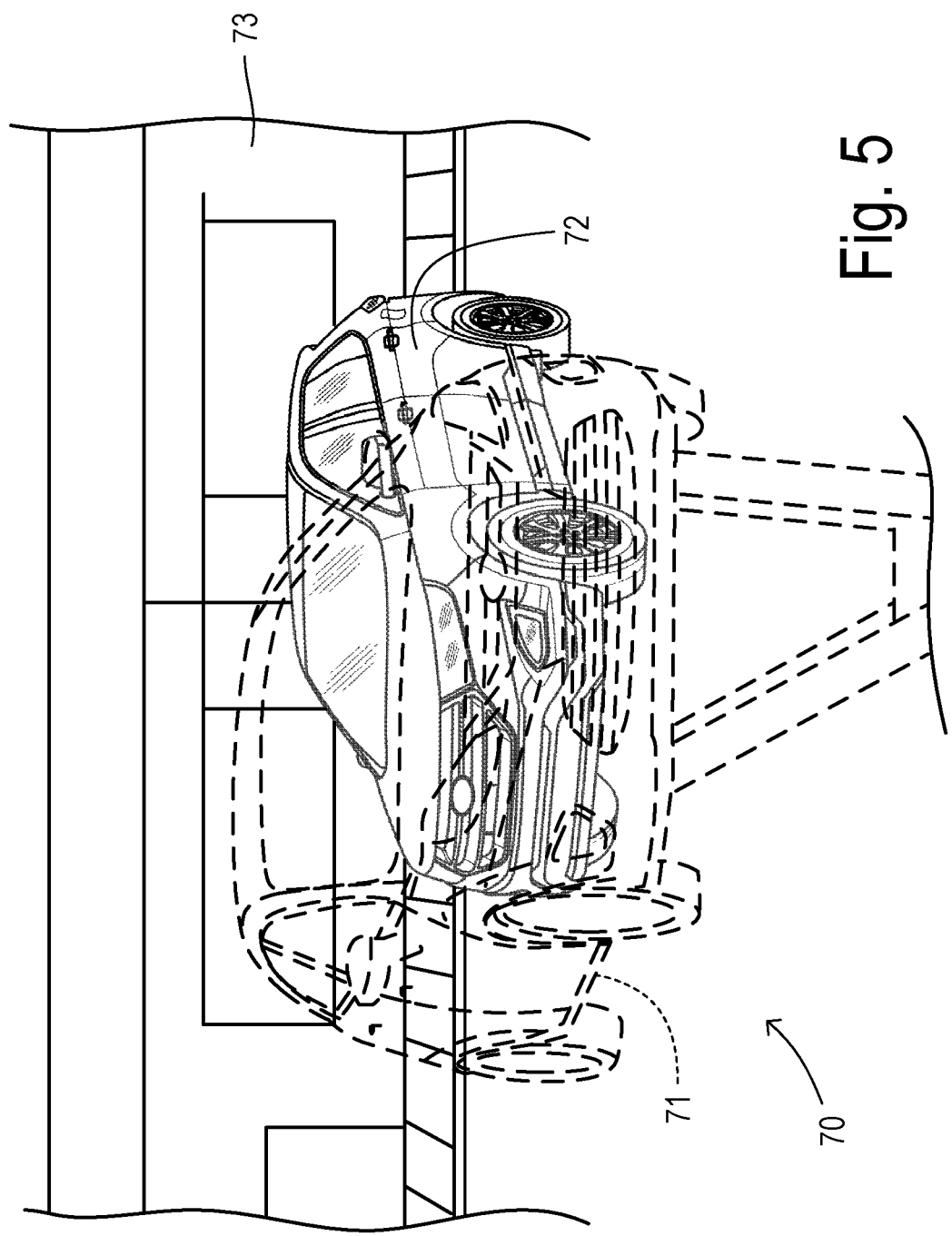
FIG. 5 depicts a composite image displayed to a driver based on combined camera images from the leading and trailing vehicles.

In operation, once both drivers have agreed to proceed with a reverse parking maneuver, the vehicle controllers are configured to leverage the outward-looking cameras of both leading and trailing vehicles for backup assistance. The controllers stitch together a merged mosaic image to display in one or both vehicles for increased visibility and to plan or predict a reverse steering capability (e.g., showing a maximum available turning radius). For example, panoramic cameras (e.g. at the front, sides, and rear surfaces of the vehicles) are activated in a first vehicle to compose a 360° view showing the surroundings of the first vehicle. Panoramic cameras are activated in the second vehicle B to compose a 360° view showing the surroundings of the second vehicle. The two views overlap, but each vehicle's panorama includes a view of the other vehicle which obscures part of the scene. The overlapping 360° images are stitched together in a way that reveals a 360° scene in which the views of either vehicle are either eliminated or suppressed (e.g., made transparent). During the reverse maneuver, the merged mosaic provides a live feed of surroundings which can be used by the driver in the controlling (active steering) vehicle to monitor the progress of the vehicles. FIG. 5 shows a portion of a merged mosaic image 70 as seen from a leading vehicle. From the perspective of the leading vehicle, surrounding objects such as a parked car 72 and a building 73 would be partially obscured by a trailing vehicle 71. Using image data captured by cameras mounted in trailing vehicle 71, mosaic image 70 either eliminates or mutes the image of trailing vehicle 71 so that the full surroundings can be seen.

Figure 6:
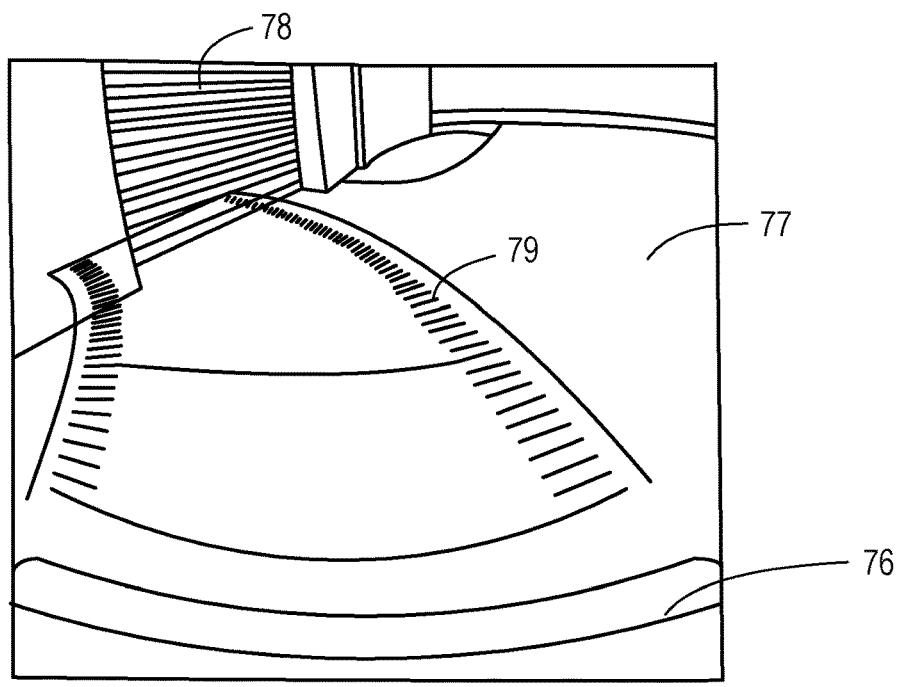
FIG. 6 depicts an image based on a backup camera with overlays for representing a predicted path of a reverse parking maneuver.

In some embodiments, the controllers may be configured to determine an available turning radius (e.g., of each vehicle in relation to the other) and to determine a projection of the current turn radius and/or a maximum turn radius for display on the display screen. FIG. 6 shows another example of a display image 75 (e.g., a portion of a merged mosaic) looking rearward from the back of the trailing vehicle. Image 75 shows a rear surface 76 of the trailing vehicle, a ground surface 77, and a garage entry door 78 (toward which the driver wants to approach in the reverse maneuver). An overlay 79 represents a pair of tire tracks superimposed over ground surface 77 which may be used to indicate either the projected path that would be traversed based on the current steering angles or a maximum turning radius that is achievable based on the dimensions/configurations of the paired vehicles. A user setting may be provided which allows a driver to select between the two types of overlays.

Figure 7:
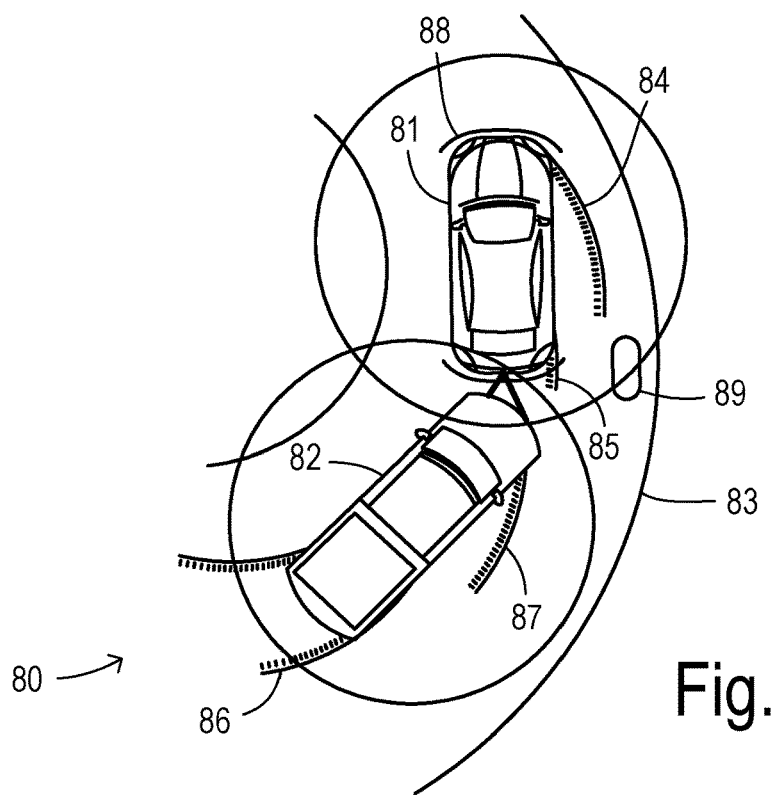
FIG. 7 depicts a simulated overhead view for display to a driver using combined camera images and having overlays for representing a predicted path of a reverse parking maneuver.

A 360° merged mosaic image 80 can be displayed using an overhead perspective as shown in FIG. 7. A leading vehicle 81 is coupled with a trailing vehicle 82 which are reversed along a driving surface 83. The vehicle controller(s) may generate a projected backup path according to the turning (e.g., steering angle, steering torque, speed, wheelbase) of the active steering vehicle and the assistive steering angle of the passive steering vehicle. Based on projected paths of each vehicle, overlays are generated for display to the driver(s) which represent the projected backup paths. The overlays may include projected tire tracks 84-87, for example. In some embodiments, track overlays 84-87 may be generated according to a calculated maximum turning radius instead of the movement path that the vehicles are currently on.

To assist in avoiding impacts with nearby obstacles, the controller(s) may define predetermined buffer zones around the vehicles such as a front buffer zone 88 for leading vehicle 81. Active sensors (such as ultrasonic backup sensors or radar) on one or both vehicles sense obstacles in the vicinity such as an obstacle 89. Detected obstacles may be highlighted on the display using overlays or extra coloration according to a probability of interference with a projected path, for example. The controller(s) may be configured to command a stoppage of movement of the vehicles during the reverse parking maneuver when the active sensor(s) or other sensors (such as the cameras) detect an obstacle within a respective predetermined buffer zone around one of the vehicles which interferes with the projected path. The controller(s) may be configured to send commands to activate the brakes on both vehicles and/or to send warning chimes to the drivers. In some embodiments, obstacles may be automatically avoided by exerting control over the steering of both vehicles. For example, the EPAS/ESC/Steering controller(s) may transmit target steering data to the active steering vehicle which would avoid the possibility of an impact. The controller(s) calculate required steering adjustments to meet the steering target based on the transmitted data (e.g., ESC Steering Angle Sensor data, etc.). Then the EPAS/Steering controls in both vehicles execute corresponding turning outputs to meet the turning target.

As mentioned above, either the leading or trailing vehicle could be assigned to perform active steering or passive steering. For example, if a driver of the leading vehicle feels more comfortable, they can move to the trailing vehicle to perform the reverse parking maneuver from there, or could stay in the leading vehicle and use the controls there to directly control either one of the vehicles while the steering of the other vehicle is automatically adjusted to best follow the movement of the controlled vehicle.

Figure 8:
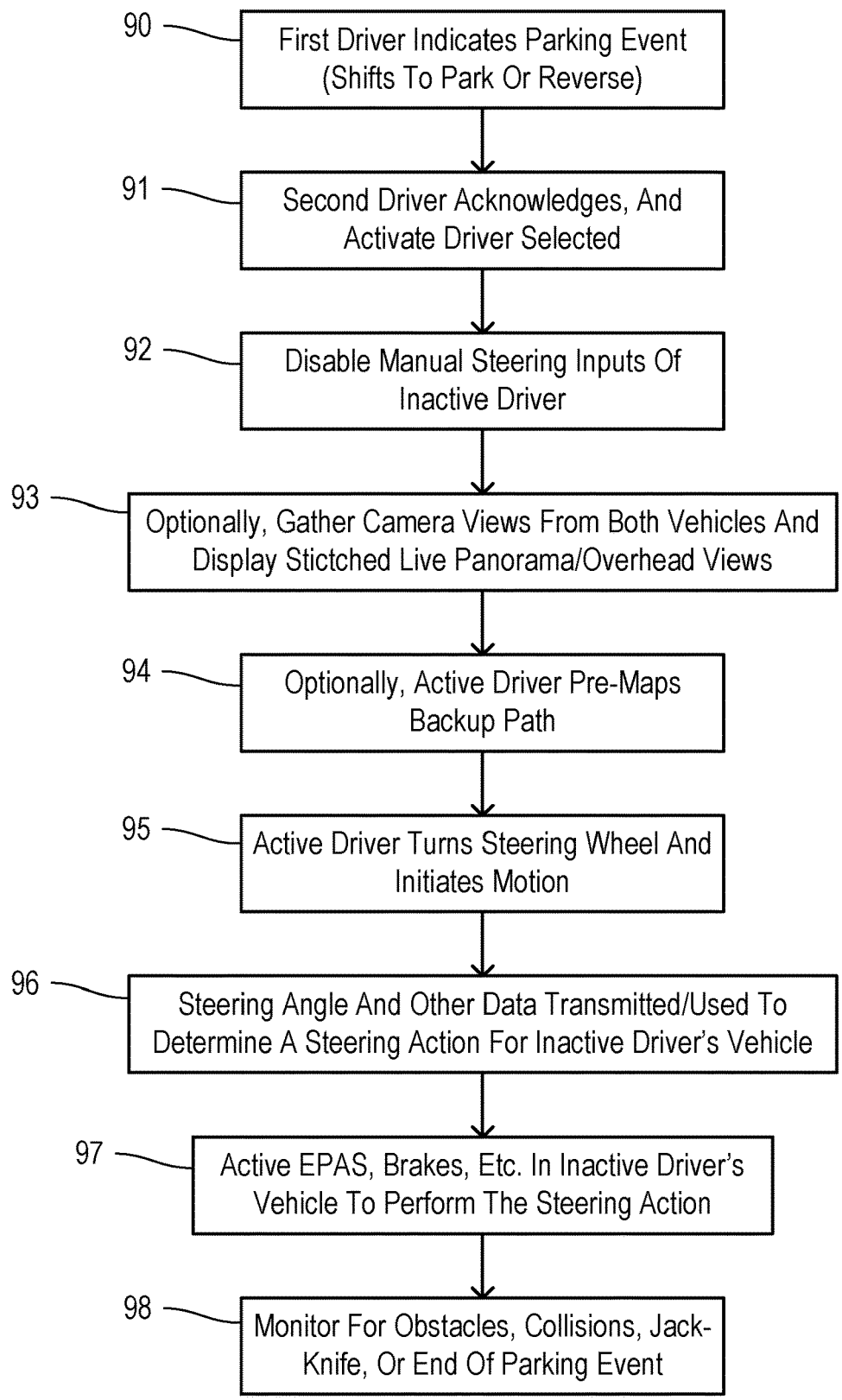
FIG. 8 is a flowchart showing one preferred method according to the invention.

FIG. 8 shows a flowchart of one method of the invention wherein a first driver indicates an intent to perform a reverse parking event in step 90. The request is communicated to the second driver (e.g., as a popup message on a touchscreen display). The second driver acknowledges the reverse parking event in step 91. As part of the request and response, a selected is made (by agreement or automatically) as to which driver will actively control the reverse driving (e.g., which vehicle will be actively steered, and which driving controls (e.g., steering wheel, throttle, brakes) the active driver will manipulate. Automatic selections may often be dictated by hardware capability limitations.

In step 92, manual steering inputs and other driving inputs are disabled for the inactive driver (e.g., in the passive steering vehicle). In some embodiments, camera images may be captured in step 93 using cameras in both vehicles and covering a large portion of the perimeters of both vehicles. Using the captured images, a live panoramic and/or overhead view is stitched together and displayed to the driver(s). Overlays may be added to the display to indicate a currently steered backup path and/or a steering path having a maximum turning radius. Based on the projected path(s), the active driver may visualize (e.g., pre-map) the backup path they wish to follow in step 94. In step 95, the active driver turns the steering wheel and initiates reverse motion. During the reverse maneuver, steering angles as represented by the driver's movement of the steering wheel and other data (e.g., speed, yaw, etc.) are transmitted between the vehicles and/or used within the source vehicle(s) to determine an appropriate steering action for the passively steered vehicle in step 96.

In step 97, steering actions of the passive steering vehicle (including steering angle adjustment using an EPAS steering actuator as well as braking or other commands) are activated according to the steering actions determined in step 96. As the vehicles continue to follow reverse movement, the controller(s) monitor in step 98 for the presence of interfering obstacles, anticipation of a jackknife condition, or the termination of the reverse parking event so that corresponding actions can be taken (e.g., engaging vehicle brakes or adjusting the commanded steering angles).

During all above described maneuvers, the charging event may be suspended if either vehicle's crash avoidance system detects a possible collision may occur and then re-activated when the warning has subsided. It may also terminate charging if either vehicle's collision system initiates an air bag or fuel cutoff.

What is claimed is:

1. An electrified vehicle comprising: a rechargeable battery system storing electrical energy used to provide propulsion of the electrified vehicle, wherein the rechargeable battery system exchanges electrical energy with a second vehicle which is coupled to the electrified vehicle in a towing relationship, and wherein the towing relationship comprises one of the vehicles being a leading vehicle and one of the vehicles being a trailing vehicle; a communication link for exchanging communication signals with the second vehicle; a first controller in the electrified vehicle which is adapted to be coupled to a second controller in the second vehicle via the communication link; wherein the first controller initiates a parking maneuver in cooperation with the second controller using the communication signals, wherein the parking maneuver includes a designated one of the vehicles being an active steering vehicle and a designated one of the vehicles being a passive steering vehicle, wherein the passive steering vehicle comprises an electrically-controlled steering actuator; wherein the first controller interacts with the second controller during the parking maneuver such that the controllers A) monitor a turning of the active steering vehicle, and B) command the electrically-controlled steering actuator according to an assistive steering angle for the passive steering vehicle based on the turning of the active steering vehicle.

2. The electrified vehicle of claim 1 wherein the turning of the active steering vehicle is monitored according to a steering wheel sensor.

3. The electrified vehicle of claim 1 wherein the assistive steering angle is determined according to a calculation for minimizing an incidence of scrubbing at wheels of the passive steering vehicle.

4. The electrified vehicle of claim 1 wherein the assistive steering angle is determined according to a calculation for conforming a movement path of the passive steering vehicle to a movement path of the active steering vehicle.

5. The electrified vehicle of claim 1 wherein the assistive steering angle is determined according to a calculation for preventing the vehicles from entering a jackknife condition.

6. The electrified vehicle of claim 1 wherein the assistive steering angle is determined according to a calculation for maximizing a turning radius when the turning of the active steering vehicle indicates a steering lock condition.

7. The electrified vehicle of claim 6 wherein the first controller cooperates with the second controller to respond to the steering lock condition by generating a throttle command or a braking command for the passive steering vehicle.

8. The electrified vehicle of claim 1 wherein each of the vehicles include a plurality of outward-looking cameras capturing respective exterior images, and wherein the first controller cooperates with the second controller to create a merged mosaic image for display on a display screen within the active steering vehicle.

9. The electrified vehicle of claim 8 wherein the first and second controllers (i) determine a maximum turning path according to a configuration of the vehicles, and (ii) display a representation of the maximum turning path on the display screen.

10. The electrified vehicle of claim 8 wherein the first and second controllers (i) generate a projected backup path according to the turning of the active steering vehicle and the assistive steering angle, and (ii) display a representation of the projected backup path on the display screen.

11. The electrified vehicle of claim 1 wherein at least one of the vehicles includes an active sensor that senses obstacles in a vicinity, and wherein the first and second controllers command a stop of movement of the vehicles during the parking maneuver when the active sensor indicates an obstacle within a predetermined buffer zone of one of the vehicles.

12. A method of controlling first and second electrified vehicles coupled together in a towing arrangement for in-flight transfer of a charge between battery systems of the vehicles, wherein the towing relationship comprises one of the vehicles being a leading vehicle and one of the vehicles being a trailing vehicle, the method comprising the steps of:
    establishing a communication link between the vehicles for exchanging communication signals;
    initiating a parking maneuver in which the trailing vehicle leads the leading vehicle, wherein the parking maneuver includes a designated one of the vehicles being an active steering vehicle and a designated one of the vehicles being a passive steering vehicle, and wherein the passive steering vehicle comprises an electrically-controlled steering actuator;

monitoring a turning of the active steering vehicle; and commanding the electrically-controlled steering actuator according to an assistive steering angle for the passive steering vehicle based on the turning of the active steering vehicle.

13. The method of claim 12 wherein the assistive steering angle is obtained from a calculation for minimizing an incidence of scrubbing between at least one wheel of the passive steering vehicle and a ground surface.

14. The method of claim 12 wherein the assistive steering angle is obtained from a calculation for conforming a movement path of the passive steering vehicle to a movement path of the active steering vehicle.

15. The method of claim 12 wherein the assistive steering angle is obtained from a calculation for preventing the vehicles from entering a jackknife condition.

16. The method of claim 12 wherein the assistive steering angle is obtained from a calculation for maximizing a turning radius when the turning of the active steering vehicle indicates a steering lock condition.

17. The method of claim 12 wherein each of the vehicles include a plurality of outward-looking cameras, the method further comprising the steps of:

capturing respective exterior images from each of the vehicles using the cameras;

creating a merged mosaic image providing an exterior view unobscured by either vehicle; and displaying the merged mosaic image on a display screen within the active steering vehicle.

18. The method of claim 17 further comprising the steps of:

determining a maximum turning path according to a configuration of the vehicles; and displaying a representation of the maximum turning path on the display screen.

19. The method of claim 17 further comprising the steps of:

generating a projected backup path according to the turning of the active steering vehicle and the assistive steering angle; and displaying a representation of the projected backup path on the display screen.

20. An electrified vehicle comprising: a rechargeable battery system couples with a second vehicle in a towing relationship for exchanging an electrical charge; a first controller in the electrified vehicle exchanging communication signals with a second controller in the second vehicle; wherein the first controller initiates a parking maneuver in cooperation with the second controller, wherein the parking maneuver includes a designated one of the vehicles being an active steering vehicle and a designated one of the vehicles being a passive steering vehicle; wherein the first controller interacts with the second controller during the parking maneuver such that the controllers A) monitor a turning of the active steering vehicle, and B) command the passive steering vehicle according to an assistive steering angle for the passive steering vehicle based on the turning of the active steering vehicle.

* * * * *